UNITED STATES PATENT OFFICE.

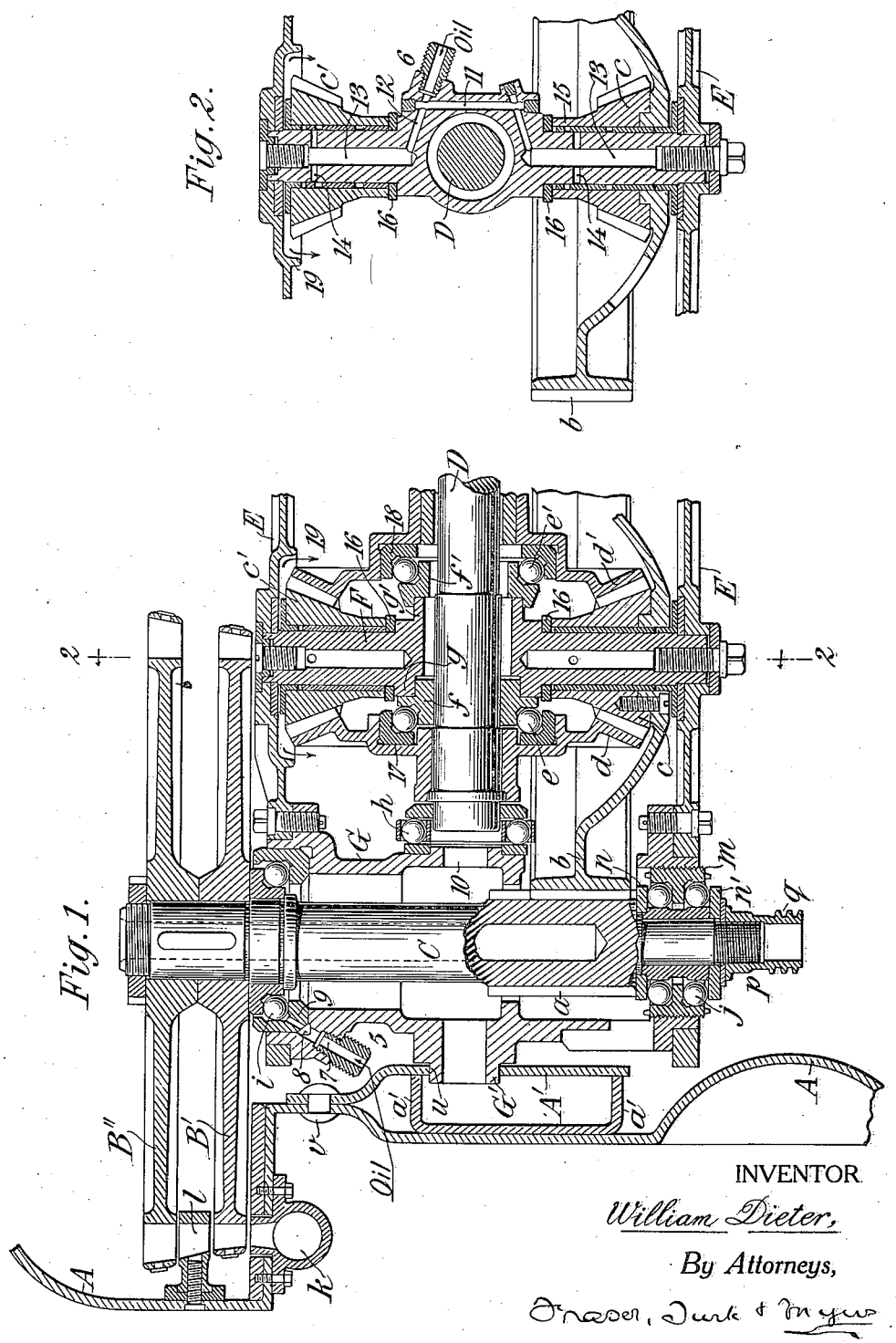

WILLIAM DIETER, OF BROOKLYN, NEW YORK.

LUBRICATING MEANS FOR THE PROPELLING MECHANISM OF AUTOMOBILE TORPEDOES.

1,358,064.  Specification of Letters Patent.  Patented Nov. 9, 1920.

Original application filed November 24, 1919, Serial No. 340,358. Divided and this application filed February 9, 1920. Serial No. 357,211.

*To all whom it may concern:*

Be it known that I, WILLIAM DIETER, a citizen of the United States of America, residing in the borough of Brooklyn, county of Kings, city and State of New York, have invented certain new and useful Improvements in Lubricating Means for the Propelling Mechanism of Automobile Torpedoes, of which the following is a specification.

This invention relates to means for lubricating the turbine propelling mechanism for the propulsion of automobile torpedoes.

The patent to F. M. Leavitt, No. 1,150,777, granted August 17, 1915, sets forth certain lubricating means for the propelling mechanism of torpedoes of the Bliss-Leavitt type. The present invention provides certain improved lubricating means, the nature and advantages of which will be made apparent as the description proceeds.

Figure 1 of the accompanying drawings is a vertical longitudinal mid-section of the driving mechanism;

Fig. 2 is a transverse section on the line 2—2 in Fig. 1;

Referring to the drawings, A designates the transverse bulkhead of the torpedo, which in general is of the usual known construction; B' and B'' are the primary and secondary turbine wheels; C is the turbine shaft; D and D' are the respective propeller shafts, and E is the bearing frame for said shafts and for the transmission gearing.

The shaft C carries a pinion $a$ near its lower end, which pinion meshes with a gear wheel $b$ which carries a bevel pinion $c$ either fixed to it or formed integrally with it. This pinion meshes on opposite sides with bevel gears $d$ $d'$, the former being fixed on the shaft D and the latter being fixed on the shaft D', as heretofore. The gears $b$ $c$ turn on a stationary vertical shaft or crosshead F made fast at both ends in the frame E, thus constituting a part of this frame. Its lower portion forms a journal or bearing for the said gears $c$ $d$, and its upper portion is similarly formed as a journal or bearing for an idler bevel pinion $c'$, the sole function of which is to balance the pinion $c$ and coöperate therewith in maintaining the gears $d$ $d'$ in unison in their opposite rotation. The bevel gears $d$ $d'$ are mounted on ball bearings $e$ $e'$ respectively, as heretofore, the stationary track rings $f$ $f'$ of these bearings being supported upon suitable bosses $g$ $g'$ formed on the crosshead F. The end thrust of the propeller shafts D is resisted by a ball bearing $h$.

The turbine shaft C is mounted in an upper ball bearing $i$ and a lower double ball bearing $j$, the outer stationary raceways of which are held in a tubular housing G which extends vertically between and is fastened to the frames E E and so constitutes a portion of the framework. In order that the turbine wheels may readily be adjusted vertically to bring them into correct relation with the nozzle $k$ and reversing block $l$, provision is made for adjusting either of these bearings vertically in order thereby to set the shaft C up or down. Preferably it is the lower bearing which is thus adjusted, its sleeve $m$ forming the outer ball raceways, being mounted adjustably in the frame, preferably by screwthreading it exteriorly and mounting it in a threaded opening in some part of the framework, preferably the foot of the tubular housing G. The sleeve $m$ is best made with a middle rib separating the two rows of balls constituting the ball bearing $j$, so that the respective balls are confined vertically between this rib and disk flanges $n$ $n'$ which are formed or fastened on the shaft C, being preferably made separately and clamped in place by the screw sleeve $p$ which carries the usual worm $q$ which drives in the known manner the lubricating pump.

For properly centering the propelling mechanism within the torpedo, and for supporting part of its weight and to that extent relieving the framework E, the housing G is formed on its forward side with a boss G' in concentric alinement with the axis of the shafts D D', this boss being received in a hole $u$ formed in a hangar A' constructed preferably as a piece of steel plate loosely united to the bulkhead A by means of a rivet or similar connection $v$.

For the lubrication of the propelling mechanism oil is supplied under pressure in any suitable manner. The manner customary in the Bliss-Leavitt torpedo is by means of an oil force pump driven from the worm $q$. For an understanding of such lubricating means reference is made to said Patent, No. 1,150,777. The oil delivered under pressure from such a force pump, or from any other source of oil under pressure, is introduced to the propelling mechanism through inlets 5 (Fig. 1) and 6 (Fig. 2), (preferably constructed as nipples for the attachment of an oil delivery pipe). These inlets communicate with bores leading to the respective bearings. In Fig. 1, inlet 5 communicates with a bore 7 which leads the oil to an annular space 8 surrounding the ball race 9, the latter having one or more holes for admitting the oil from this annular duct to the balls. The oil is thus introduced copiously during the entire run of the torpedo, so that it is in considerable excess beyond the needs of the upper ball bearing $i$; the excess of oil streams down within the housing G and around the shaft C, and affords an ample supply of oil to both the upper and lower ball sets of the lower ball bearing $j$. The oil which streams down the shaft, as soon as it reaches the teeth of the pinion $a$, is thrown off centrifugally therefrom, whereby an ample supply of oil is directed through opening 10 in the housing for lubricating the ball bearing $h$.

The oil entering through inlet 6 enters ducts 11, 12 and 13, the latter being duplicated in the upper and lower portions of the stationary crosshead F, and flows from the ducts 13 through transverse ducts 14 to lubricate the bearing surfaces of the gear wheel $d$ and its pinion $c$, and the idler pinion $c'$. These gears and pinions have preferably each a bushing 15 which turns with the pinion or gear, so that the bearing contact is between the inner face of the bushing and the outer face of the journal formed on the crosshead F. The oil is supplied under such pressure and in such excess that a surplus of oil flows through and is discharged from the respective bearing surfaces, and is caught by revolving washers or flanges 16 which project somewhat beyond the journals and pinions, so that these flanges serve to centrifugally throw off oil therefrom. The oil thrown off is caught in the race rings 17, 18, of the ball bearings $e$ and $e'$, whereby these ball bearings are abundantly lubricated. A sufficient excess of oil also falls from these bearings within the gears $d$ $d'$ to lubricate the teeth of these gears where they engage the pinions $c$ $c'$. Thus the whole mechanism is amply lubricated in a very simple and easily constructed manner.

Heretofore the oil for the pinion bearings has been introduced at the lower end of the crosshead, and the duct has extended through the crosshead, being in free communication with the opening through which the inner propeller shaft passes; where such opening forms part of a solid bearing, as heretofore, such construction is useful as affording a means for lubricating such bearing, but even then it entails a considerable loss of oil. By the present improved construction the oil ducts 13 in the crosshead have no communication with the central opening through which the propeller shaft passes, the oil being conducted in separate streams to the upper and lower oil ducts 13.

The lubricating means provided by the present invention has several advantages. It enables ample lubrication to be effected by the use of a much smaller amount of oil than heretofore. The use of a great excess of oil is undesirable as the excess oil is vaporized to a considerable extent by the heat liberated in the superheater, and results in the torpedo leaving a trail of smoke in its wake. It is desirable to avoid such smoke trail, and this result is accomplished by the present invention. The diminution in oil expenditure is due to several features of the construction. The turbine shaft is oiled wholly by introducing oil to the upper bearing, which is the one receiving the greater thrust due to the nozzle impact, and which is subjected to considerable heat by reason of the hot motor gases exhausting into the chamber in which the turbine turns, wherein a temperature of 600° to 800° F. exists during the run of the torpedo. The oil fed to and through this upper bearing has an important cooling effect upon the bearing. Heretofore the upper bearing has been oiled from inside the shaft by an outward flow of oil which at the high speed of the turbine shaft (about 10,000 R. P. M.) resulted in the oil being almost entirely atomized or converted into spray before reaching the outer ball race, so that its cooling effect was minimized. By the present improvement the oil is introduced to the outer and stationary ball race, and this is made with inturned flanges at top and bottom which momentarily retain the oil in an annular path traversed by the balls, thus effecting ideal lubrication, together with the maximum cooling effect. The surplus oil streaming from this bearing is mainly divided between the lower ball bearing and the thrust bearing $h$, both of which receive ample oil for their lubrication, and this without using so large a quantity of oil as to result in any considerable discharge of surplus oil into the exhaust. The oil introduced through inlet 6 to the crosshead ducts 13 is in ample volume to thoroughly lubricate the pinion bearings. This requires a constant forced stream of oil between the bearing surfaces. The inevitable excess is utilized to lubricate the gear teeth and the ball bearings $e$ $e'$. The centrifugal discharge of oil from the flanges 16 results in filling the hollow of the gears $d$ $d'$ with atomized oil, which amply lubricates the ball bearings and the gear teeth. It is desirable to avoid any atomization of the oil outside of the gear group, and to this end provision is made for catching the oil thrown off centrifugally from the bushing at the upper end of the pinion $c'$ and causing it to lose its rotary motion and drip directly downward without atomization. For this purpose the upper frame E is formed in its under side as an inverted dish or saucer having a flange 19 which catches the out-flying oil and causes it to drip downward, as shown by the arrows, so that it is subjected for the shortest possible time to the heat of the upper frame member and drips quickly down into a cooler zone beneath, thereby minimizing the vaporization of the oil. Another advantage of the improved construction is that the only oil connections are made with stationary parts, whereas previously the turbine shaft was oiled through a swivel joint, which involved considerable difficulty.

It must not be inferred from the particularity of detail with which the preferred construction is herein shown and described, that the invention is limited to such details, it being obvious that the construction may be considerably modified without departing from the essential features of the invention which are set forth in the appended claims.

This application is a division of my application Serial No. 340,358, filed November 24, 1919, to which reference may be made for a more full description of those features of construction other than the lubricating means.

I claim:

1. In a torpedo, the combination of a turbine and its shaft, inner and outer propeller shafts, intermediate gearing, and a bearing frame therefor comprising ball bearings for said turbine shaft, and means for lubricating such bearings comprising an oil inlet and duct communicating from a source of oil to the ball race of one of said bearings.

2. The combination of claim 1, plus means for conducting an excess of oil from such bearing to the other bearing of said turbine shaft.

3. The combination of claim 1, said bearing frame comprising a housing inclosing the turbine shaft, ball bearings for said shaft mounted in said housing, the oil inlet to the upper of said bearings, and the interior of the housing communicating thence with the lower of said bearings for conducting surplus oil to the latter.

4. The combination of claim 1, the bearing frame comprising an end thrust ball bearing for one of said propeller shafts, and means for discharging surplus oil from said turbine shaft bearing to said end thrust bearing.

5. The combination of claim 4, the bearing frame comprising a housing having an opening communicating with said thrust bearing, and the turbine shaft carrying means for throwing oil centrifugally through said opening to lubricate such thrust bearing.

6. In a torpedo, the combination of a turbine and its shaft, inner and outer propeller shafts, intermediate gearing, and a bearing frame therefor comprising a crosshead forming bearing journals for members of such gearing, said crosshead having a central opening for a propeller shaft, and having oil ducts non-communicating with said opening, an oil inlet admitting oil to said ducts, and branch ducts leading thence to the journal bearing surfaces for lubricating said bearing.

7. In a torpedo, the combination of a turbine and its shaft, inner and outer propeller shafts, intermediate gearing, and a bearing frame thereof comprising a crosshead forming bearing journals for members of such gearing, ducts leading oil to the bearing surfaces of said gearing, said bearing frame having ball bearings for the respective propeller shafts, and a member of said gearing carrying a projecting portion communicating with the bearing surfaces and adapted to receive surplus oil therefrom and throw it off centrifugally to lubricate said ball bearings.

8. In a torpedo, the combination of a turbine and its shaft, inner and outer propeller shafts, intermediate gearing, and a bearing frame therefor, with an oil inlet admitting oil to a duct in said frame to lubricate a member of said gearing, said frame provided with a downward flange adapted to catch oil discharged centrifugally from such bearing and cause it to drip downward to diminish vaporization of the oil.

9. In a torpedo, the combination of a turbine and its shaft, and an upper ball bearing for said shaft, the outer member or ball race of said bearing having upper and lower flanges, of means for introducing a stream of oil to said member, between said flanges for lubricating and cooling the bearing.

10. In a torpedo having turbine propelling mechanism, comprising a turbine and its shaft, and bearings for said shaft, lubricating means therefor comprising oil inlets to stationary members of the bearings for said shaft.

In witness whereof I have hereunto signed my name.

WILLIAM DIETER.